C. E. Burt.

Brush Machine.

No. 3,221. Reissued Dec. 1, 1868.

Witnesses:

Edwin A. Hildreth,

E. H. Burt,

Inventor:

George E. Burt.

N. PETERS, PHOTO-LITHOGRAPHER, WASHINGTON, D. C.

UNITED STATES PATENT OFFICE.

NATHAN H. SPAFFORD, OF BOSTON, MASSACHUSETTS, ASSIGNEE, BY MESNE ASSIGNMENTS, OF GEORGE E. BURT.

IMPROVED MACHINE FOR CLEANING AND ASSORTING BRISTLES.

Specification forming part of Letters Patent No. 10,498, dated February 7, 1854; extended seven years; Reissue No. 3,221, dated December 1, 1868.

DIVISION B.

*To all whom it may concern:*

Be it known that GEORGE EDWARD BURT, of Harvard, in the county of Worcester, (late of Westford, in the county of Middlesex,) in the State of Massachusetts, has invented new and useful improvements in the mechanism for operating rakes or combs while acting upon bristles subjected to their action; and I do hereby declare that the following is a full and exact description thereof, reference being had to the annexed drawings, making a part of this specification, and to the letters of reference marked thereon, in which—

Figure 2:
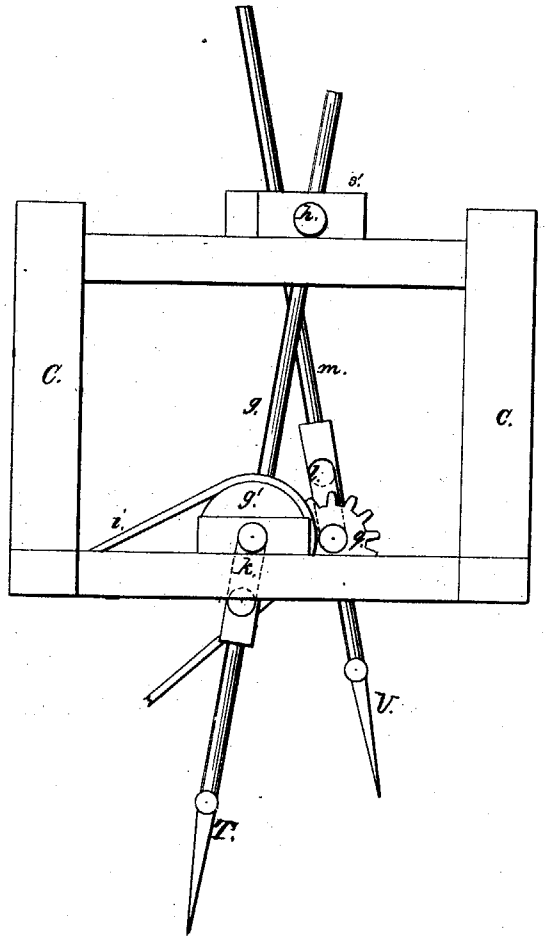
Figure 1:
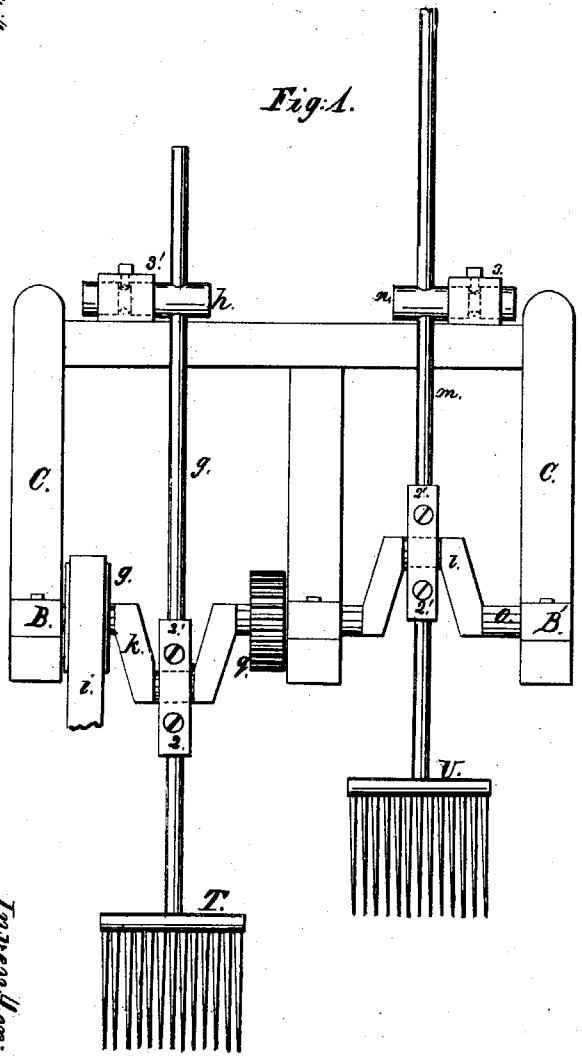

Figure 1 is a side elevation of the forks and mechanism for operating the same, independent of the other parts of the machine. Fig. 2 is an end elevation of the same.

The nature of this division of my invention consists in constructing and arranging combs or rakes, and operating them with mechanism so combined and arranged as to actuate the combs or rakes and give them a dipping motion, with an increased accelerating motion when the forks enter the material to be operated on, and a retarding and lifting motion when the combs or rakes are withdrawn from the material upon which they operate, thus causing them to throw off and free themselves from any substance that might otherwise adhere to them, thus entirely overcoming all liability of the combs or rakes getting clogged.

Similar marks of reference denote the same parts in both figures.

C C is the frame for supporting the operating mechanism of the rakes or combs, and may be constructed in various ways. *n* and *h* are arms or guides, held in position by boxes 3 and 3′, and are constructed with holes for the staves *g* and *m*, the upper ends of which they hold in position. *n* and *h* are so pivoted to the main frame as to admit their periphery or outer portion to rock or move in the arc of a circle, in such a manner as to allow the staves *g* and *m* to assume freely all the angles caused by the various positions of the cranks *k* and *l* when revolving, thus holding the combs in position to operate in the desired manner.

The combs or rakes T and U are firmly attached to the lower ends of the staves *g* and *m*. *k* and *l* are rotating cranks; which are connected by cogs. These cranks may be propelled by belts or gears, according to the various purposes for which the combs or rakes are to be used. The staves *g* and *m* are connected to the wrists of the cranks *k* and *l* by boxes 2 and 2′, placed at a point considerably above the combs or rakes T and U. The crank-shafts *k* and *l* are held in position on the main frame by boxes B and B′. *g′* is a pulley, to which power is applied to actuate the combs.

Operation: When propelling power is applied to the pulley *g′*—or its equivalent, a gear—the crank-shafts *k* and *l* are made to revolve on their bearings in the boxes B B′. The cranks *k* and *l* actuate the staves *g* and *m*. The combs or rakes T and U are attached to the staves considerably below the wrists of the cranks *k* and *l*. The staves *g* and *m* are held in position at the top by the rocking guides or arms *h* and *n*; therefore the comb or rake teeth are made to move in an oblong orbit, with an increased accelerated motion (while acting upon the material) in the same proportion as the relative lengths of the crank-arms, the length of the staves below the crank-wrist, and the position of the upper connection on the main frame, which holds and guides the top of the staves.

As the teeth of the rake or comb reach the extremity of their orbit, where they ascend, they are not only retarded in their motion, but the rake is so rocked on the moving fulcrum that the teeth point toward the direction in which they have been moving any material upon them; therefore at this point, as the motion of the rakes or combs is retarded and the teeth point in the proper direction, all bristles that may have been drawn out or taken up by the rakes will tend to be thrown off by the previously-acquired impulse.

What I claim as new, and desire to secure by Letters Patent, is—

1. The method of applying combs or rakes by giving motion to the combing or raking apparatus by means of the crank *k*, rocker-shaft *h*, or their equivalents, so combined and operated as to give a curvilinear movement to the teeth, substantially as above described.

2. The staff *g*, carried, near its center, upon the rotating crank-shaft *k*, and connected to the main frame, near one end of the staff, by any mechanism admitting both the rotating and back-and-forward motion simultaneously, so constructed and arranged as to allow the crank to revolve freely and carry the combs or rake T upon the operating end of the staff *g*, all arranged and operating substantially as described and set forth.

3. The combination of the staff *g*, attached, as above described, at one end, to the frame C, the box 2, the crank *k*, and the comb or rake T, when combined to operate substantially as described.

4. Connecting the comb or rake T to the main frame with three movable junctions or joints, constructed and arranged to allow the staff to assume freely any angle caused by the revolutions of the crank, substantially as described and set forth.

5. The arm *h* or its equivalent, when attached to the main frame, and so constructed and arranged as to hold in position the upper end of the staff *g*, and admit the staff to play freely in all the various angles of the same, caused by the revolutions of the crank *k*, substantially as described.

6. The combs or rakes T and U, composed of any number of teeth, and attached to staves actuated by crank-shafts, and held in position by mechanism so arranged that, by revolving the cranks, there shall be imparted to the forks a curvilinear motion, substantially as described.

7. The cranks *k* and *l*, in such relative position with each other that they will cause the combs or rakes that are attached to them to act alternately, substantially as described and set forth.

8. Supporting or sustaining the combs or rakes upon fulcra which move in the arc of a circle, said rakes having, also, a rocking or back-and-forward motion upon said moving fulcra, substantially as described, and for the purpose set forth.

In testimony whereof I have signed my name to this specification before two subscribing witnesses.

NATHAN H. SPAFFORD.

Witnesses:
E. A. KELLY,
DANIEL S. BURNHAM.